United States Patent
Morris

[15] 3,677,287
[45] July 18, 1972

[54] RELIEF VALVE

[72] Inventor: John Morris, Halsall, Nr. Ormskirk, England

[73] Assignee: Joseph Lucas (Industries) Limited, Birmingham, England

[22] Filed: Dec. 9, 1970

[21] Appl. No.: 96,523

[30] Foreign Application Priority Data

Dec. 9, 1969 Great Britain..................59,937/69

[52] U.S. Cl.................................137/491, 251/43
[51] Int. Cl..........................................F16k 31/12
[58] Field of Search......................137/491; 251/43, 44

[56] References Cited

UNITED STATES PATENTS

| | | | |
|---|---|---|---|
| 2,417,994 | 3/1947 | Sheets | 251/45 X |
| 2,815,921 | 12/1957 | Bigelow | 251/43 X |
| 3,164,166 | 1/1965 | Tennis | 251/43 X |
| 3,411,531 | 11/1968 | Clark et al. | 137/491 |
| 3,578,019 | 12/1968 | Turolla | 137/491 |

*Primary Examiner*—Alan Cohan
*Assistant Examiner*—Robert J. Miller
*Attorney*—Holman & Stern

[57] ABSTRACT

A relief valve for a reversible delivery pump includes a bore having two portions of different diameters and a pair of ports opening into the bore on either side of a valve seat located between the two portions. A spool is slidable in the bore to engage the seat and includes two piston parts engaged in the respective portions of the bore. A selector valve allows the smaller of the pistons to communicate with whichever of the ports is at the higher pressure. Opposite ends of the spool intercommunicate via restricted orifice, the flow through the orifice being regulated by pilot valve responsive to the higher pressure.

7 Claims, 3 Drawing Figures

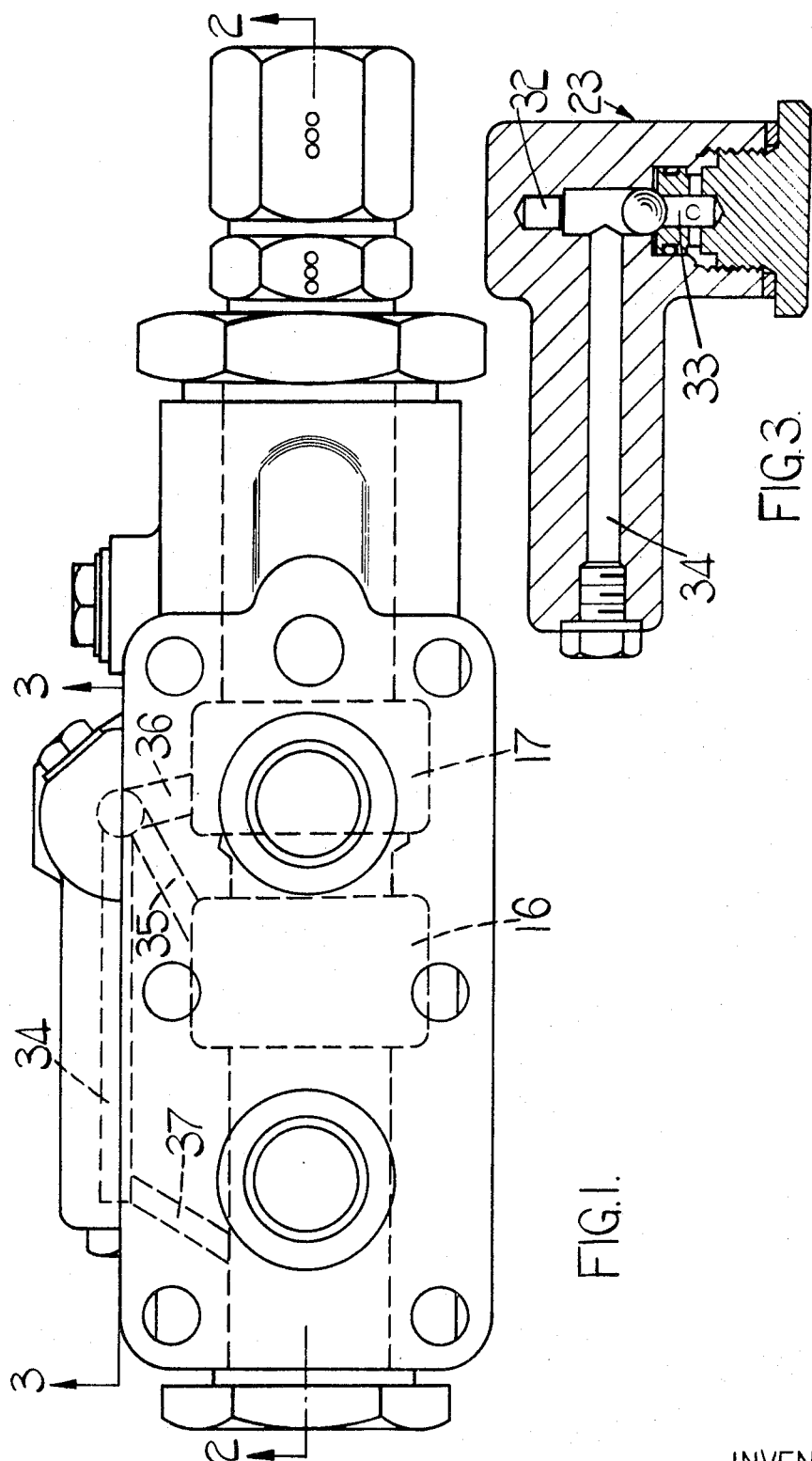

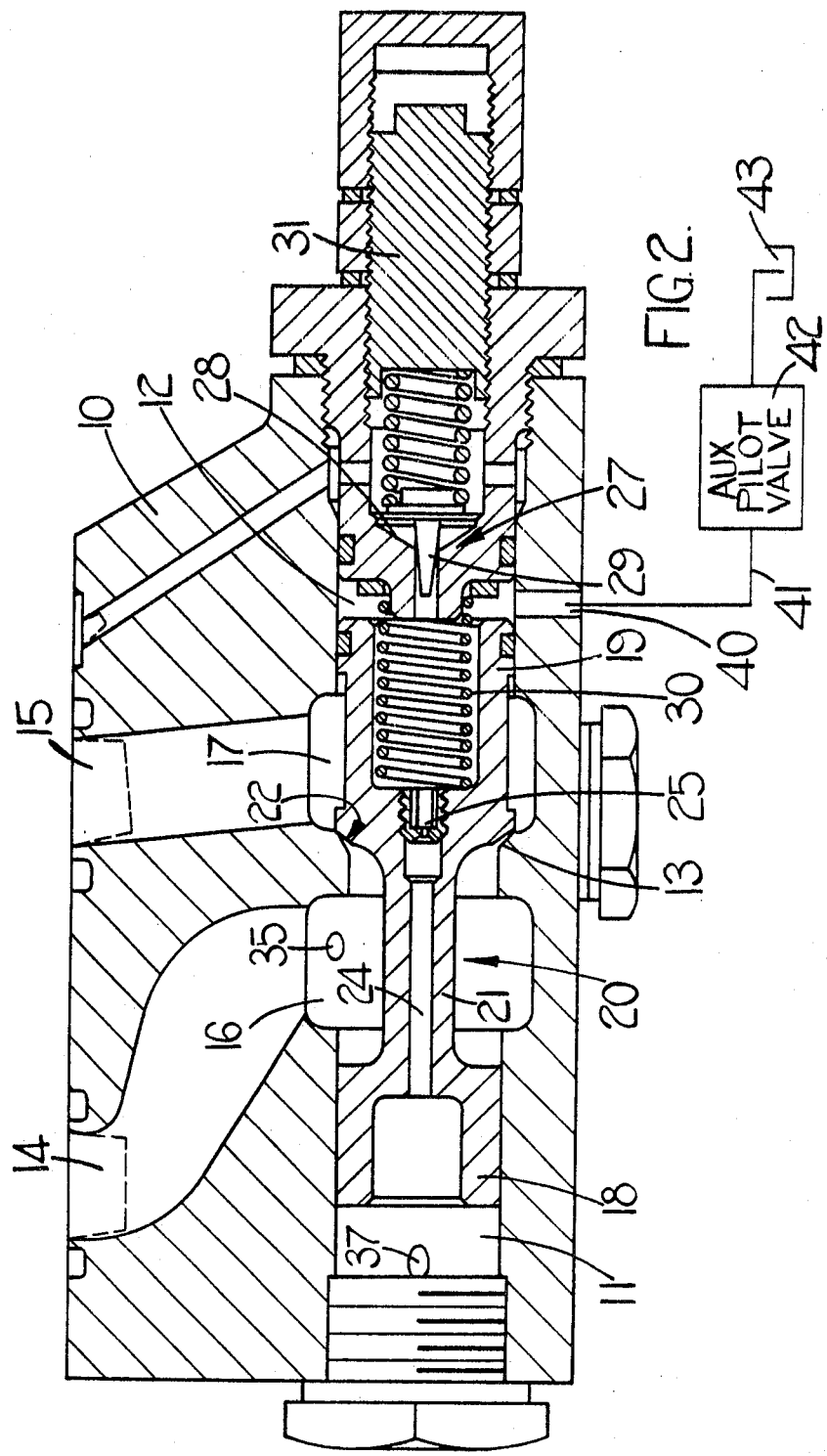

RELIEF VALVE

This invention relates to a relief valve for use with a reversible delivery pump.

A relief valve in accordance with the invention comprises a body formed with a passage including two cylindrical portions of different diameters and a seat between said portions, said body having a pair of ports opening into said passage at opposite sides of said seat, a spool slidable in said passage and having larger and smaller piston portions slidable respectively in said larger and smaller cylindrical portions, and a seat surface adapted to make contact with the seat in the passage on an effective diameter intermediate the diameters of said cylindrical portions whereby flow between the ports is prevented, an automatic valve device whereby, in use, the port which, for the time being, is at higher pressure in use is connected to the end of the smaller cylindrical portion on the side of the smaller piston remote from the seat surfaces, passage means, including a flow restrictor, connecting said end of the smaller cylindrical portion to the opposite end of the larger cylindrical portion and a pilot valve for permitting fluid to escape from said opposite end of the larger cylindrical portion when the pressure rises above a predetermined value to permit fluid flow through said passage means, the arrangement being such that when the pressure rises above a predetermined value, the flow through said passage means will create a pressure drop sufficient to overcome the loading of the spool, which exists as a result at least in part of the difference between the diameters of the piston portions, where by the spool is diaplaced to separate the seat surface from the seat.

In the accompanying drawings:

FIG. 1 is an external view of one example of a relief valve according to the invention, and FIGS. 2 and 3 are sections on the corresponding lines in FIG. 1.

The valve has a body 10 which includes a passage, opposite end portions 11, 12 which are of cylindrical form, the portion 11 being of small diameter than the portion 12. A frusto-conical seat 13 is formed in the passage between the two end portions 11, 12. The body has a pair of ports 14, 15 opening into grooves 16, 17 in the passage on opposite sides of the seat surface 13.

The end portions 11, 12 of the passage in the body respectively receive a pair of piston portions, 18, 19 of a spool 20. Interconnecting the piston portions 18, 19 is a stem 21 of reduced diameter and at the juncture of the stem 21 with the larger piston portion 19 is a frusto-conical seat surface 22 having an included angle less than seat 13 so as to effectively make line contact with the seat surface 13.

The diameter of the line contact between the seats 13, 22 is intermediate the diameters of end portions 11, 12 respectively in accordance with the formula:

Area X − Area A = Area B − Area X where Area X = area enclosed by said line contact,
Area A = area of cylindrical portion 11,
Area B = area of cylindrical portion 12.

Associated with the ports 14, 15 is an automatic shuttle valve 23, having passages 32, 33, 34 which respectively communicate with grooves 16, 17 and end portion 11, via respective passages 35, 36, 37. Valve 23 serves to connect whichever of the ports 14, 15 is, for the time being, at the higher pressure, to the end of passage portion 11 to act on the smaller piston portion 18 to urge the spool in a direction to separate the seat surfaces 13, 22. A passage 24 through the spool 20 connects opposite ends of the passage in the body. A flow restrictor 25 in this passage 24 controls fluid flow therethrough.

A pilot valve 27 is arranged to allow fluid to escape from the end of the cylindrical portion 12 remote from the seat surface 13. This pilot valve comprises a seat 28, and a spring loaded, tapered control element 29 which can be displaced away from the seat 28 against its spring loading by pressure at said end of the cylindrical portion 12.

The spool is urged by a spring 30 so that the seat surfaces 13, 22 are interengaged when there is no pressure present. The effect of this spring loading is enhanced by the action of high pressure fluid on the two piston portions of the spool and on one of the two annular areas of the seat surface 22 either inside or outside the seat 13, the difference in the areas of the causing a force to be applied to the spool to urge it to the lift. It will be noted that, because of the choice of the diameter of the seat 13, this force does not vary in accordance with the selection of the port which is at high pressure.

When, in use, the higher pressure rises sufficiently high to open the pilot valve 27, there will be flow through the passage 24 and the pressure acting on the piston portion 12 will fall. As the controlled pressure continues to rise the pilot valve will open progressively until the pressure acting of piston portion 12 falls of low that the spool can be displaced to the right as viewed in the drawing. When this occurs there will be direct flow between the seat surfaces from the high pressure port to the low pressure port and a limit is thus set on the higher pressure.

This limit is determined by the spring loading of the spool, the area difference between the piston portions of the spool and the characteristics of the pilot valve. The latter can be varied by adjusting an abutment 31 to alter the spring loading of the pilot valve control element 29.

Passage portion 12 also communicates, via a port 40 and a passage 41 with an auxiliary pilot valve 42. Pilot valve 42 is operable by external means, as for example by an electro magnet, to discharge fluid in portion 12 to a drain 43, and thereby to operate the relief valve irrespective of the ratio of the pressures in ports 14, 15.

Having thus described my invention what I claim as new and desire to secure by Letter Patent is:

1. A relief valve comprising a body formed with a passage including two cylindrical portions of different diameters and a seat between said portions, said body having a pair of ports opening into said passage at opposite sides of said seat, a spool slidable respectively in said larger and smaller piston portions slidable respectively in said larger and smaller cylindrical portions, and a seat surface adapted to make contact with the seat in the passage on an effective diameter intermediate the diameters of said cylindrical portions whereby flow between the ports is prevented, an automatic valve device whereby, in use, the port which, for the time being, is at higher pressure in use is connected to the end of the smaller cylindrical portion on the side of the smaller piston remote from the seat surfaces, passage means, including a flow restrictor, connecting said end of the smaller cylindrical portion to the opposite end of the larger cylindrical portion and a pilot valve for permitting fluid to escape from said opposite end of the larger cylindrical portion when the pressure rises above a predetermined value to permit fluid flow through said passage means, the arrangement being such that when the pressure rises above a predetermined value, the flow through said passage means will create a pressure drop sufficient to overcome the loading of the spool, which exists as a result at least in part of the difference between the diameters of the piston portions, whereby the spool is displaced to separate the seat surface from the seat.

2. A relief valve as claimed in claim 1 in the differences between the area enclosed by the said effective diameter and the areas of the larger and smaller piston portions respectively are substantially equal.

3. A relief valve as claimed in claim 1 in which the said seat and the said seat surface are each of frusto-conical form and have different included angles.

4. A relief valve as claimed in claim 1 which includes spring means for biasing the said spool in a direction to prevent flow between the ports.

5. A relief valve as claimed in claim 1 in which the said passage is if a bore in the spool.

6. A relief valve as claimed in claim 1 in which the pilot valve comprises a seat and a tapered control element biased into engagement with the seat.

7. A relief valve as claimed in claim 1 which includes an auxiliary pilot valve, operable independently of the first-mentioned pilot valve to permit fluid to escape from the opposite end of the larger cylindrical port.

* * * * *